D. S. STUCK.
VEHICLE BRAKE.
APPLICATION FILED DEC. 28, 1910.
1,014,978.
Patented Jan. 16, 1912.
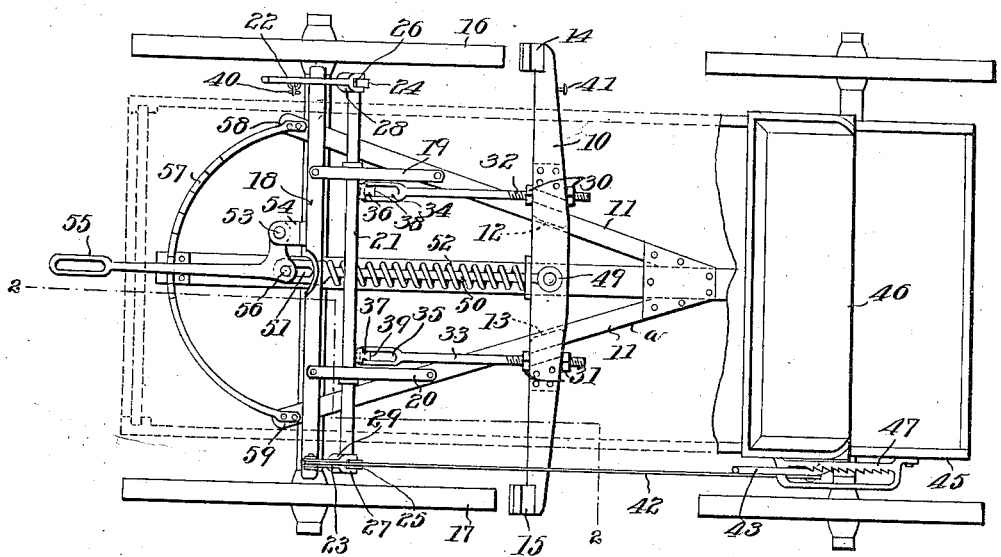
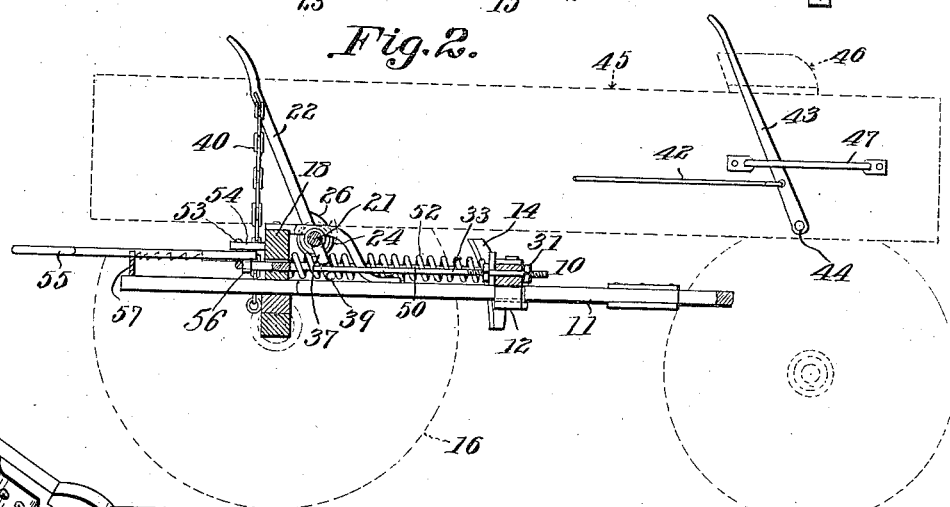
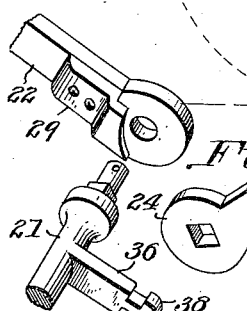
Witnesses
David S. Stuck, Inventor
by C. A. Snow & Co.
Attorneys ated Jan. 16, 1912.# UNITED STATES PATENT OFFICE.

DAVID S. STUCK, OF COCOLAMUS, PENNSYLVANIA.

VEHICLE-BRAKE.

1,014,978.   Specification of Letters Patent.   Patented Jan. 16, 1912.

Application filed December 28, 1910. Serial No. 599,750.

*To all whom it may concern:*

Be it known that I, DAVID S. STUCK, a citizen of the United States, residing at Cocolamus, in the county of Juniata and State of Pennsylvania, have invented a new and useful Vehicle-Brake, of which the following is a specification.

This invention relates to vehicle brakes, and has for its object to improve the construction and increase the efficiency of devices of this character.

It is the object of this invention to provide a brake which may be set by different mechanisms and from different points, each brake-setting mechanism operating independently of the others.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings thus employed:—Figure 1 is a plan of a portion of the running gear and a portion of the body of a vehicle, with the improved brake of my invention applied thereto. Fig. 2 is a longitudinal section on the line 2—2 of Fig. 1. Fig. 3 is an elevation of a portion of the brake controlling mechanism operating from the driver's seat. Fig. 4 is an elevation of one of the brake beam hangers, partly in section. Fig. 5 is a plan of one of the lever arms for operating the brake setting mechanism. Fig. 6 represents the parts shown in Fig. 5 in perspective and disconnected.

In carrying out the invention there is provided a brake beam 10 bearing over the rear "hound" members 11 of the running gear, and provided with clips as at 12—13 extending beneath the hounds as illustrated more fully in Fig. 4, so that while the beam is free to move to a limited extent longitudinally of the running gear, it will not move vertically, being held from downward movement by the hounds, and from upward movement by the clips 12—13.

The brake beam is provided with shoes 14—15 for engaging the rear wheels 16—17 of the vehicle, these shoes being of any desired form. Extending between the rear bolster member 18 and the hounds 11 and connected at the ends respectively thereto, are brackets 19—20, and mounted for rotation upon these brackets is a shaft 21, having lever arms, 22—23 loosely engaging its ends, as shown. Rigidly connected to the shaft 21 adjacent to the lever arms 22—23, are disks 24—25 having radial lugs 26—27 extending into the paths of keepers 28—29 on the lever arms, so that the lever arms will rotate freely around the shaft when moved in one direction, but will pick up the shaft and rotate the same when moved far enough to cause the keepers to engage the lugs, as hereafter explained. Extended through the brake beam, and provided at their end with nuts 31 and 30, located upon opposite sides of the brake beam, are threaded rods 32—33 having longitudinal slots 34—35 at their rear ends into which slots arms 36—37 depending from the shaft 21 extend, the arms having enlarged terminals 38—39 to prevent the displacement of the arms from the slots. By this construction the arms 36—37 will pick up the rods and set the brake when the shaft 21 is rotated in one direction, but will not affect the brake when the shaft is rotated in the opposite direction. The rods will move independently of the arms when the beam 10 is actuated by means other than the shaft 21. The lever arm 22 is provided with a chain 40 adapted to engage a stop 41 on the beam 10 when the lever arm is depressed, and the lever arm 23 is connected by a rod 42 to a hand lever 43 pivoted at 44 to the side of the vehicle body 45 adjacent the driver's seat 46, the lever 43 operating over a ratchet bar 47 in the usual manner. By this means the brake may be set either from the driver's seat by actuating the lever 43 or from the side of the vehicle by actuating the lever 22, and each lever operates independently, as hereafter explained.

Connected at 49 to the brake beam 10 is a rod 50 extending rearwardly and through the rear axle or between the axle and bolster 18, and provided at its rear end with a longitudinal slot 51. Surrounding the rod 50 is a spring 52 bearing at its ends against the beam 10 and rear axle, and thus maintaining the beam yieldably in inoperative position. Pivoted at 53 in a bracket 54 on the bolster 18, is a bell crank lever 55 having a rigid pin 56 at its terminal, the pin engaging the slot 51. An arcuate, notched bar 57 is attached at its ends 58—59 to the projecting ends of the rear hounds 11, the bar extending beneath the lever 55, and engaging the latter by its teeth, to hold the lever in adjusted positions. By this arrangement, if the brake is to be set from the driver's seat, the lever 43 is pushed forward, the rod 42 rotating the lever arm 23 upon the shaft 21 and causing the keeper 29 to pick up the disk 25 by engaging the lug 27 and thus rotating the shaft and causing the arms 38—39 to pick up the rods 32—33 and operate the brake beam 10. The rotation of the shaft 21 causes the disk 24 to rotate with the shaft, but the lug 26 of the disk will be moved away from the lever 22 and therefore will not affect the lever. The rearward movement of the brake beam when actuated by the lever 43 does not tilt the rear lever 55, since the slot 51 moves freely over the pin 56. When the lever 22 is actuated, the keeper 28 thereon picks up the lug 26 of the disk 24 and thus rotates the shaft 21 in the manner hereinbefore set forth and producing the same results as when the lever 43 is operated, the rotation of the shaft 21 moving the disk 25 and its lug 27 forward and without affecting the levers 23 or 43, as will be obvious. When the lever 55 is operated, the rod 50 is actuated and the brake is set thereby, the slots 34—35 in the rods 32—33 moving freely over the arms 38—39 and not affecting them or the lever arms or other parts associated therewith. Thus the brake may be set and held in its adjusted position from the driver's seat, from the side of the vehicle, or from the rear of the vehicle as may be required, each brake operating means being independently operative, as above noted.

The device is simple in construction, can be adapted readily to any of the various forms of vehicles manufactured.

Having thus described the invention, what is claimed is:—

In a device of the class described, a wheel-mounted supporting structure including an axle and a bolster carried by the axle; hounds in the supporting structure; brackets connecting the bolster with the hounds; a shaft journaled for rotation in the brackets, and provided with radial arms; a brake beam slidable upon the hounds; connections between the arms and the brake beam; a rod connected with the brake beam and extended through the supporting structure; a compression spring surrounding the rod and bearing at one end against the brake beam and at the other end against the supporting structure; means for rotating the shaft; an arcuate bar connecting the diverging ends of the hounds; a bell crank pivoted to the supporting structure and loosely engaged with the rod, whereby the shaft may be rotated without moving the bell crank; and interengaging elements upon the bell crank and the arcuate bar, whereby the bell crank may be engaged with the arcuate bar, to hold the rod against movement, and to maintain the brake beam in set position, after the brake beam has been moved to set position, by the aforesaid means for rotating the shaft.

In testimony that I claim the foregoing as my own, I have hereto affixed my signature in the presence of two witnesses.

DAVID S. STUCK.

Witnesses:
W. H. BRUBAKER,
W. W. ROWE.

---

Copies of this patent may be obtained for five cents each, by addressing the "Commissioner of Patents, Washington, D. C."